April 17, 1951 C. W. KLUG 2,548,983
COMPENSATED TEMPERATURE CONTROL SYSTEM
Filed Nov. 12, 1946

INVENTOR.
CHARLES W. KLUG
BY
Charles S. Penfold
ATTORNEY

Patented Apr. 17, 1951

2,548,983

UNITED STATES PATENT OFFICE 2,548,983

COMPENSATED TEMPERATURE CONTROL SYSTEM

Charles W. Klug, Chicago, Ill., assignor to Productive Inventions, Inc., a corporation of Indiana Application November 12, 1946, Serial No. 709,360

2 Claims. (Cl. 236—9)

This invention relates generally to control systems and more particularly is directed to a system for maintaining a uniform or predetermined temperature within the space or area to be conditioned.

Many commercial and domestic systems of heat control now in use fluctuate to such an extent that the furnace not only fails to supply heat to a room quickly when required by the room thermostat, but continues to supply heat and overshoot the amount called for by such thermostat.

One of the important objects of the present invention is to provide a unique temperature control system in which auxiliary means are associated with the room thermostat and heat source thermostat in such a manner that the difference between the ambient or prevailing temperature and the desired temperature for the space to be conditioned controls the temperature of the furnace and at the same time controls the high limit or maximum temperature thereof, thereby overcoming to an appreciable extent the disadvantages above referred to. The system supplies heat in direct relation to the need for such heat or more specifically, in direct relation to the percentage of the total differential, preferably three degrees Fahrenheit, that the actual temperature is below the desired temperature.

Another object of the invention is to provide an improved heat source thermostat including a cam arrangement and heat responsive means associated therewith which operate or act in conjunction with the room thermostat for controlling the actuation of any combustion rate control instrumentality such as a liquid fuel burner, a valve, or switch mechanism. The invention, among other things, contemplates the provision of a thermostat which is influenced by the ambient temperature to be controlled, and a second thermostat which is adjusted by the first thermostat and influenced by a heat source.

Another object of the invention is to provide a maximum heat source temperature control or "high limit control" as an integral part of the heat control system.

A further object of the invention is to provide improved heat responsive means adapted to supply electric power impulses for remotely and variably adjusting the temperature of the heat source, the arrangement being such that the average total power of such impulses will vary in proportion to any differential which may exist between the prevailing and the desired temperature as mentioned above. It may be said that the system produces and maintains a definite temperature at the heat source in direct relation to the heating effect of a pulsating electric current.

Another object of the invention is to hold or maintain a predetermined minimum temperature at the heat source when there is no demand for the admission of heat to the space to be conditioned. The method is also such that the system is not affected by any change or variation in voltages.

Other objects and advantages of the invention reside in its simplicity of structure; low cost of manufacture, assembly, and installation; economical operation and reduction in fuel consumption; sensitivity; reliability; and its accuracy in modulation to obtain the desired predetermined and uniform temperature in the space or room to be conditioned or heated.

Other objects and advantages of the invention will become apparent after the description hereinafter set forth is considered in conjunction with the drawing annexed hereto.

Figure 1:
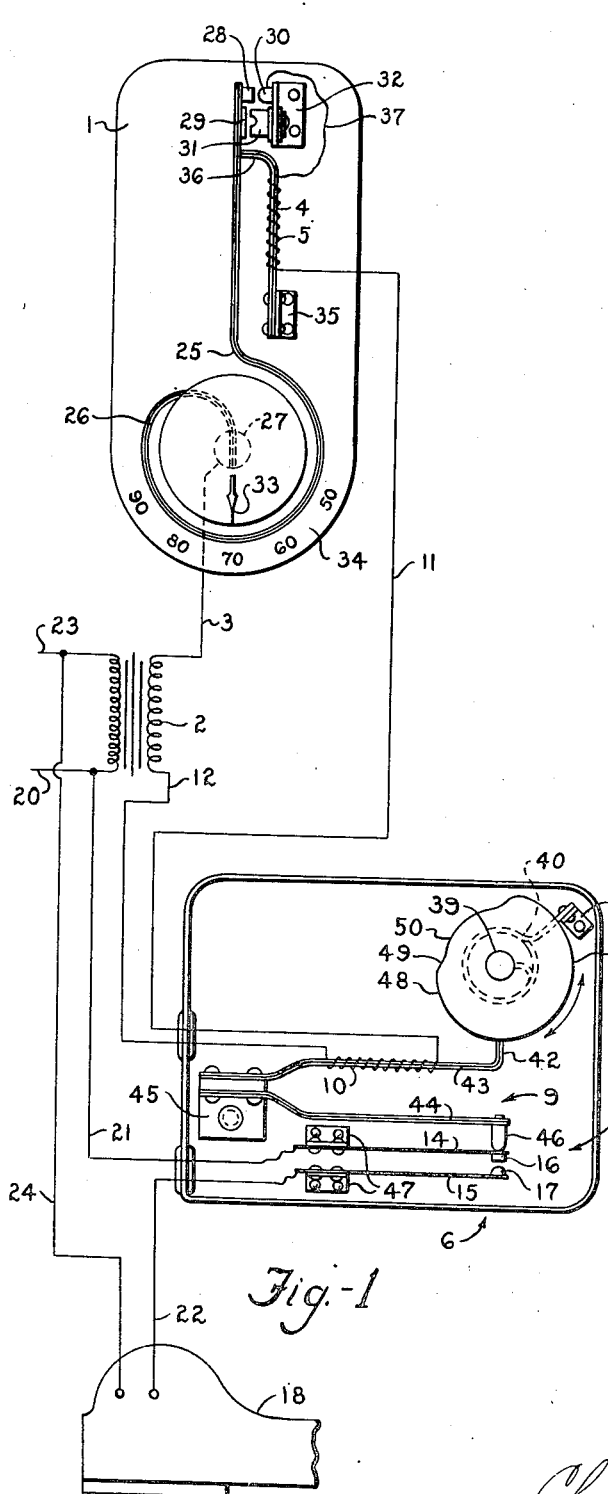
Figure 1 is a diagrammatic view of the control system.
Figure 2:
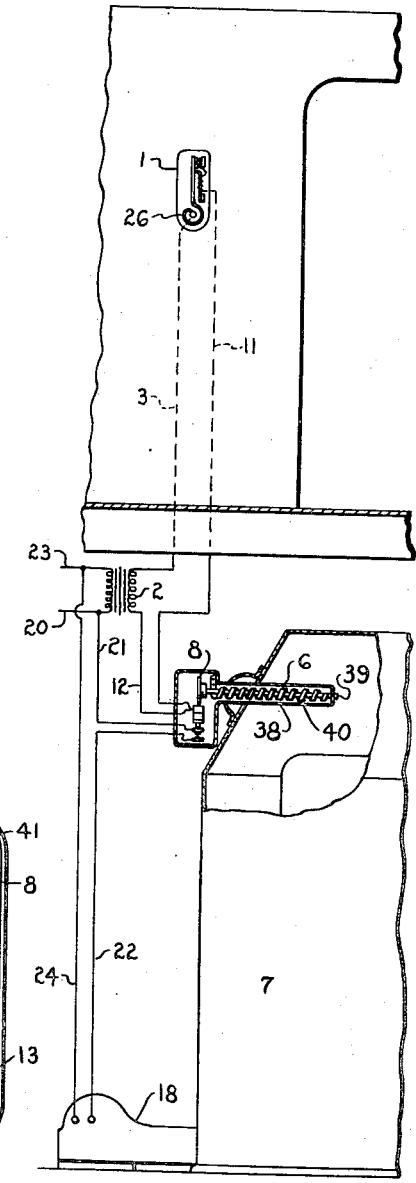
Figure 2 is a side view of the heat source thermostat, a section of which has been broken away for the purpose of illustrating the disposition of the heat source thermostat with respect to the bonnet of a furnace.

The invention contemplates the utilization of a plurality of instrumentalities which may be assembled or operatively connected together in different arrangements but as herein illustrated, the preferred arrangement generally includes, among other things, a room or space thermostat 1; connected to a power supply such as a transformer 2 by a conductor 3; a relatively small bimetallic member 4 and its heating element 5 associated with the room thermostat whereby to assist in influencing the operation of such thermostat; a heat source thermostat 6 adapted for disposition at an appropriate location with respect to a furnace 7 to actuate a cam 8; a compensating heat responsive unit generally designated 9, the operation of which is influenced in part by the room and heat source thermostats; a heating element 10 associated with the compensating unit 9 and connected to the heating element 5 related to member 4 and to transformer 2 by conductors 11 and 12, respectively; and a switch generally designated 13 which may be comprised of a pair of yieldable terminals 14 and 15 carrying contacts 16 and 17, respectively, for periodically controlling the actuation of any combustion rate control instrumentality such as a liquid fuel burner 18 which may increase and decrease combustion in a furnace. The yieldable switch blade 14 is connected to a power supply line 20 by a conductor 21, and the other yieldable switch blade 15 to the liquid fuel burner 18 by a conductor 22 and the burner to the other power supply line 23 by conductor 24.

The room thermostat 1 preferably includes a relatively large bimetallic member 25 one extremity of which may be provided with a circular formation 26 supported on a rotatable terminal 27 and its other extremity, which is preferably straight, carries a contact 28 and a metal bar 29. The contact 28 and bar 29 are adapted to cooperate with a stationary contact 30 and a permanent magnet 31 supported on a mounting 32 carried by the base of the thermostat. A bar and magnet substantially corresponding to the bar 29 and magnet 31 are customarily employed in such thermostats in order to effect a quick opening and closing of the circuit at spaced predetermined temperatures and to prevent arcing between the contacts 28 and 30. A pointer or indicator 33 fixed for rotation with terminal 27 is provided for movement with respect to a dial or scale 34 graduated in degrees so that the operator may set the thermostat to the desired room temperature and properly position the contact 28 with respect to the stationary contact 30. A thermometer, not shown, is associated with the room thermostat.

As noted above, one particular object of the invention is to provide improved modulating means whereby a predetermined and uniform temperature may be maintained in the room or space to be conditioned. The improved arrangement is preferably such that the room thermostat is caused to actuate at frequent intervals, and at the same time, provide an effective and accurate correlative action between the various instrumentalities or units above referred to which comprise the system or organization. The means employed to assist in accomplishing this object includes the bimetallic member 4 and its associated heating element 5. The member 4 is preferably disposed in a generally spaced apart parallel relation with respect to the upper extremity of member 25. One end of member 4 is preferably permanently secured and adjusted to a bracket 35 so that its upper curved end 36 operatively engages the upper extremity of member 25. The heating element 5 operatively related to member 4 is connected to the stationary contact 30 by a conductor 37, such conductor being so disposed that member 4 may freely operate. The electric heating impulses are utilized to proportionally control the compensating unit generally designated 9 by which the heat source temperature is properly adjusted to compensate for any differential which may exist between the ambient and desired temperature.

The heat source thermostat 6 is preferably disposed at the most desirable location, such location in many installations, being subject to the type of furnace that is employed. As herein depicted the thermostat is arranged in the bonnet or header of a hot air furnace and preferably includes an elongated frame 38 within which a rod 39 is mounted for rotation by the expansion and contraction of a helical thermo-responsive member 40. One end of the helical member 40 is secured to the inner extremity of the rod 39 and its other end is anchored to a fixed support 41 as clearly shown. The cam 8, above referred to, which constitutes a desirable element of the present invention, is keyed to the outer extremity of the rod and operatively engages an upturned follower end 42 of a flexible bimetallic leg portion 43 forming a component part of the compensating unit generally designated 9.

The unit 9 also includes an ambient temperature compensating flexible bimetallic leg portion 44 which is preferably arranged in spaced apart parallel relation with respect to the leg 43. These legs are preferably connected to a pivotally mounted bracket 45 supported on a casing for the unit. The heating element 10 referred to above is associated with the flexible bimetallic leg 43 for influencing its operation and the free end of the flexible bimetallic leg 44 is provided with an insulator stud or abutment 46 which operatively engages the yieldable switch blade 14. The arrangement is preferably such that if the ambient temperature changes, the effect on the flexible bimetallic leg 43 resulting in such change will be compensated for by the oppositely equal effect on the flexible bimetallic leg 44, so that leg 43 is primarily positioned in accordance with the heat transmitted to it by element 10. The leg 43 is preferably constructed so that the extent of its deflection or movement is predetermined. The switch blades 14 and 15 are insulated from each other and each is supported on a bracket 47. Any switch suitable for the purpose may be employed in lieu of the switch 13, for example, a mercury switch.

The cam 8, referred to above, may be constructed as desired but is preferably formed to provide a working surface 48 all points of which surface are unequally spaced from the cam center so that rotation of the cam in a counter-clockwise direction by the heating of the heat responsive member 40 will position such surface to permit the follower end 42 of the leg 43 and leg 44 to gradually move upwardly to open the switch 13 at a point corresponding to the deflection of member 43, which results in stopping the operation of the liquid fuel burner 18 and diminishing the supply of heat to the room. When the heat responsive member 40 cools, the cam will move in a clockwise or reverse direction and gradually cause the legs 42 and 43 to pivotally descend or move downwardly to effect engagement of the contacts 16 and 17 to again close the switch 13. The periphery of cam 8 is also preferably provided with an arcuate surface 49 all points of which may be equi-distant from the cam center. This cam is further provided with an interruption, offset, or step working surface 50 which joins together the surfaces 48 and 49; the purpose of such surfaces will be described more in detail subsequently.

For purposes of exemplification, the various parts of the system are shown in positions prepared for operation. When the temperature in the space or room to be conditioned drops below the level at which the room thermostat has been set, bimetallic member 25 of said thermostat will move until it reaches a position where magnet 31 influences the bar 29 to cause terminal 28 to snap against terminal 30 to simultaneously energize the heating elements 5 and 10 associated with auxiliary bimetallic member 4 and bimetallic leg 43 in a manner whereby such members and legs will react against member 25 and cam 8, respectively. Such energization is affected by current flowing from the transformer 2 to contact 28 through the intermediation of conductor 3, terminal 27, and member 25, through contacts 28 and 30, conductor 37, heating element 5, conductor 11, heating element 10, and back to transformer 2 or supply through conductor 12. As a consequence, heating element 5 will heat bimetallic member 4 to cause it to bend and forcibly engage bimetallic member 25 in a direction to separate contacts 28 and 30. Upon such separation heating element 5 cools so as to permit members 4 and 25 to substantially return to their original or former positions so that the contacts 28 and 30 will again engage each other to send a current impulse to heating elements 5 and 10.

The arrangement is such that if for any reason the temperature of the room to be conditioned falls considerably below the temperature called for by the room thermostat, bimetallic member 25 will require a greater reactive of counteracting force applied to it by the heating of bimetallic member 4 in advance of an interruption in the circuit by separation of contacts 28 and 30. In other words, a greater quantity of heat will be required in element 5 to effect sufficient distortion of bimetallic member 4 to break the circuit, and to supply this additional heat, current will necessarily flow for a longer period of time in heating element 5 and 10 to obtain the desired influence on leg 43 of the compensating unit. However, for a room temperature slightly lower than the temperature called for by the room thermostat bimetallic member 25 the duration of the electric heating impulse will be shorter and as the room temperature rises bimetallic member 25 will accordingly require a relatively small reactive of counteracting force applied to it by the heating of bimetallic element 4 so that electric impulses of a shorter duration will be sufficient to interrupt the circuit by moving contact 28 away from contact 30, in which event impulses of a shorter duration will flow through heating elements 5 and 10. The temperature differential at the room thermostat or the increase or decrease above or below the desired temperature of the room or space may be made to react or function as desired depending on the character and adjustment of bimetallic members 4 and 43 and the activity of bimetallic leg 43 which may also be predetermined. A variation in impulse duration will effect a change in the position of the bimetallic member 43. The arrangement is such that a change of room temperature will effect a substantially corresponding change in the temperature and output of the furnace for the purpose of increasing the rate of combustion on a fall of temperature and to reduce or decrease it on a rise of temperature. As a result of such regulation the temperature will tend to substantially obtain a constant predetermined value so that, for example, if the room temperature is low the temperature of the furnace will be correspondingly high and conversely when the room temperature is higher, the furnace temperature will be lower.

It will also be apparent during the operation of the system that as the bimetallic leg 43 bends under the influence of heating element 10 as described, the compensating unit 9 will slightly pivot in a clockwise direction and when leg 43 bends sufficiently the stud 46 on the ambient temperature compensating bimetallic leg 44 will urge blade 14 in a direction to cause the contact 16 to engage contact 17 to close the switch 13 and as a consequence, the liquid fuel burner 18 will be actuated to promote combustion of the fuel in the firepot of the furnace. As the fire produces additional heat to be supplied to the room to be conditioned, the heat source thermostat 6 will be caused to gradually rotate cam 8 in a counter-clockwise direction resulting from the reaction of the helical thermo-responsive element 40. The arrangement is preferably such that the liquid fuel burner will operate for a time sufficient to produce a temperature of approximately 150 degrees in the atmosphere surrounding element 40. As the cam 8 rotates in a counter-clockwise direction the upturned follower end 42 of leg 43 will be allowed to gradually ascend or move upwardly, due to the receding character of the working surface 48 on the cam, until leg 43 is deflected sufficiently so that the contacts 16 and 17 will disengage to open the switch 13, whereupon the liquid fuel burner 18 stops and combustion and admission of heat to the space to be conditioned is diminished. The cam 8 in effect revolves just enough to allow the legs 43 and 44 to pivot and offset the slight deflection or change in the leg 43. If the temperature in the space to be conditioned has not changed in any substantial respect after the admission of additional heat, the room thermostat will continue to produce electric pulses as before mentioned to operate the compensating unit to again close the switch to operate the liquid fuel burner to again promote combustion so as to admit a fixed quantity of heat of a predetermined temperature to the space to be conditioned. The switch 13 is closed when the cam follower end 42 of leg 43 is somewhere on the working surface 48. More specifically, the position of follower end 42 depends on the temperature difference in the space to be heated when contacts 16 and 17 just close and the temperature and output of the furnace also depend on such position. During this period of operation, as alluded to above, the heating element 5 has been influencing the activity of bimetallic member 4 in a direction to periodically overcome or bias the closing force or action of member 25 in a direction to disengage terminals 28 and 30.

If the difference between the ambient or prevailing temperature and the temperature desired is considerable, the furnace might overheat so provision is made for an automatic shut-off or interruption by means of the step surface 49 over which the follower end 42 may quickly ride onto the rest surface 50. This step provides an escape movement for the compensating unit 9 to positively insure separation of the contacts 16 and 17. The difference between the ambient and desired temperature controls the temperature of the furnace and at the same time controls the high or maximum limit of the temperature in the furnace.

The system is preferably constructed so that it is independent of all draft conditions, fuel value, or response to characteristics of the heat plant itself because all dampers and checks are in maximum positions until the temperature of the furnace or heat source has reached, for example, 150 degrees as stated above. After the heat source has attained such temperature all combustion controls are automatically rendered inoperative. This arrangement is desirable because heat of a definite temperature is called for instead of arbitrarily initiating combustion to produce an unknown quantity of heat. Accordingly, it will be apparent that the system provides means for supplying predetermined quantities of heat at substantially the same temperature in the space to be heated at the time or times required. As a consequence, less fuel is required and undershooting and overshooting as alluded to above, is prevented. During the intervals that the system is not operating, the furnace will act to hold the fire in a desirable state or condition so that upon the closing of the switch 13 there will be a comparatively rapid rate or increase in combustion. It will also be evident that the various components or instrumentalities comprising the system are so constructed and arranged that any variation in the voltage existing in the electrical hookup will not affect the operation of the heating elements 5 and 10. In other words, it is merely necessary that the elements 5 and 10 be heated and after they become heated, any increase in voltage will not cause greater activity of bimetallic elements 4 and 43.

In view of the foregoing, it would be evident among other things, that the invention is applicable to substantially any heating system; that it may be quickly installed; economical to operate and reduces fuel consumption; that it will accurately modulate to obtain the desired predetermined and uniform temperature in the space or room to be conditioned. It will also be apparent that the hook-up is such that the system is not affected by any change or variation in voltages or any of the other factors above referred to. Moreover, it will be manifest that the difference between the ambient or prevailing temperature and the desired temperature for the space to be conditioned controls the temperature of the furnace and at the same time controls the high limit or maximum temperature thereof.

Having thus described my invention, it will be evident that many modifications of the same may be made within the scope of the claims.

I claim:
1. A system including a room thermostat, a heat source, a heat source thermostat disposed at the heat source, cam means actuated by said heat source thermostat, a source of electricity, means for controlling the operation of the heat source, switch means electrically connected to the electrical source and to the controlling means for actuating the controlling means, a first thermo-responsive means including ambient temperature compensating means respectively cooperable with said cam means and said switch means, auxiliary thermo-responsive means carried by said room thermostat, heating elements associated with both of said thermo-responsive means and connected to the electrical source so that said heating elements when energized will influence the operation of said thermo-responsive means for controlling the operation of the system in a manner whereby the difference between the ambient temperature and the desired temperature of the room to be conditioned will control the temperature of the heat source.

2. Control apparatus comprising a cam, a first thermo-responsive means for operating the cam, a switch having a pair of relatively movable contacts, and a second thermo-responsive means comprising a pair of generally parallel relatively movable thermo-responsive members interposed between the cam and switch with one member engaging the cam and the other one of the contacts, said contacts and the points of engagement between the members and the cam and said one contact being arranged substantially in alignment in a manner whereby movement of said cam by said first thermo-responsive means will cause the cam to press against the second thermo-responsive means to cause the latter to actuate the switch.

CHARLES W. KLUG.

REFERENCES CITED

The following references are of record in the file of this patent:

UNITED STATES PATENTS

| Number | Name | Date |
| --- | --- | --- |
| 1,783,904 | Carter | Dec. 2, 1930 |
| 1,885,053 | Slough | Oct. 25, 1932 |
| 1,937,610 | Van Alsburg | Dec. 5, 1933 |
| 2,070,175 | Persons | Feb. 9, 1937 |
| 2,159,342 | Persons | May 23, 1939 |
| 2,216,246 | Larson | Oct. 1, 1940 |
| 2,300,092 | Baum | Oct. 27, 1942 |
| 2,302,603 | Davis | Nov. 17, 1942 |
| 2,510,481 | Sagar | June 6, 1950 |

FOREIGN PATENTS

| Number | Country | Date |
| --- | --- | --- |
| 104,756 | Sweden | June 16, 1942 |
| 219,187 | Switzerland | May 1, 1942 |